United States Patent [19]

O'Neal

[11] 4,322,923
[45] Apr. 6, 1982

[54] MOUNTING FOR INFLATABLE DOCK SEAL
[76] Inventor: Larry O'Neal, 4953 Timbercrest Dr., Canfield, Ohio 44406
[21] Appl. No.: 204,459
[22] Filed: Nov. 6, 1980
[51] Int. Cl.³ .............................................. E06B 7/22
[52] U.S. Cl. .................................... 52/2; 52/173 DS; 49/477; 49/498; 49/493; 428/36; 428/99
[58] Field of Search .......... 428/99, 36; 52/2, 173 DS, 52/173 R; 49/477, 464, 493, 498

[56] References Cited
U.S. PATENT DOCUMENTS

| | | | |
|---|---|---|---|
| 3,303,615 | 2/1967 | O'Neal | 52/2 |
| 3,391,503 | 7/1968 | O'Neal | 52/2 |
| 4,045,925 | 9/1977 | O'Neal | 52/2 |
| 4,262,458 | 4/1981 | O'Neal | 52/2 |

Primary Examiner—Marion McCamish
Assistant Examiner—Alexander S. Thomas
Attorney, Agent, or Firm—Harpman & Harpman

[57] ABSTRACT

A mounting for an inflatable dock seal which is used for closing the area around a dock opening in a wall with respect to a truck or trailer provides uninflated flexible tubular members on several sections of the inflatable dock seal and positions structural members in the flexible tubular members. A rigid mounting channel is secured to the wall about the dock opening which permits the quick and easy engagement of the structural members within the channel. Cylindrical holding plugs are then positioned in the channel locking the inflatable dock seal on the wall about the dock opening therein.

4 Claims, 5 Drawing Figures

U.S. Patent  Apr. 6, 1982  Sheet 1 of 2  4,322,923
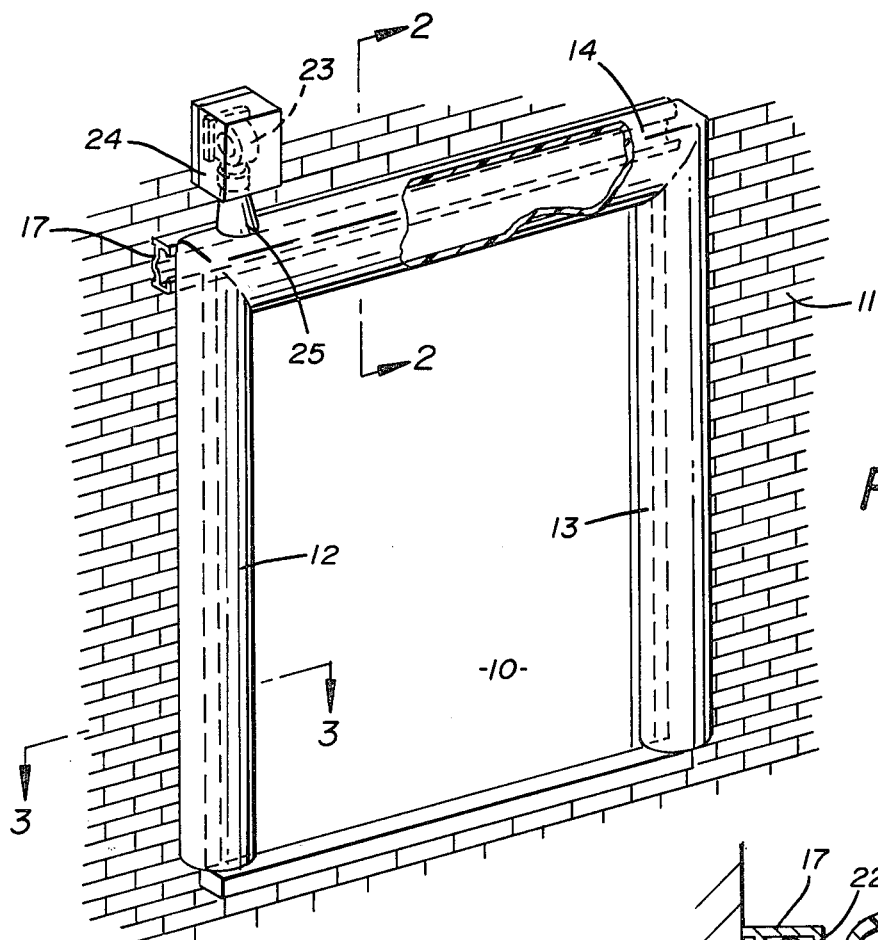
FIG. 1
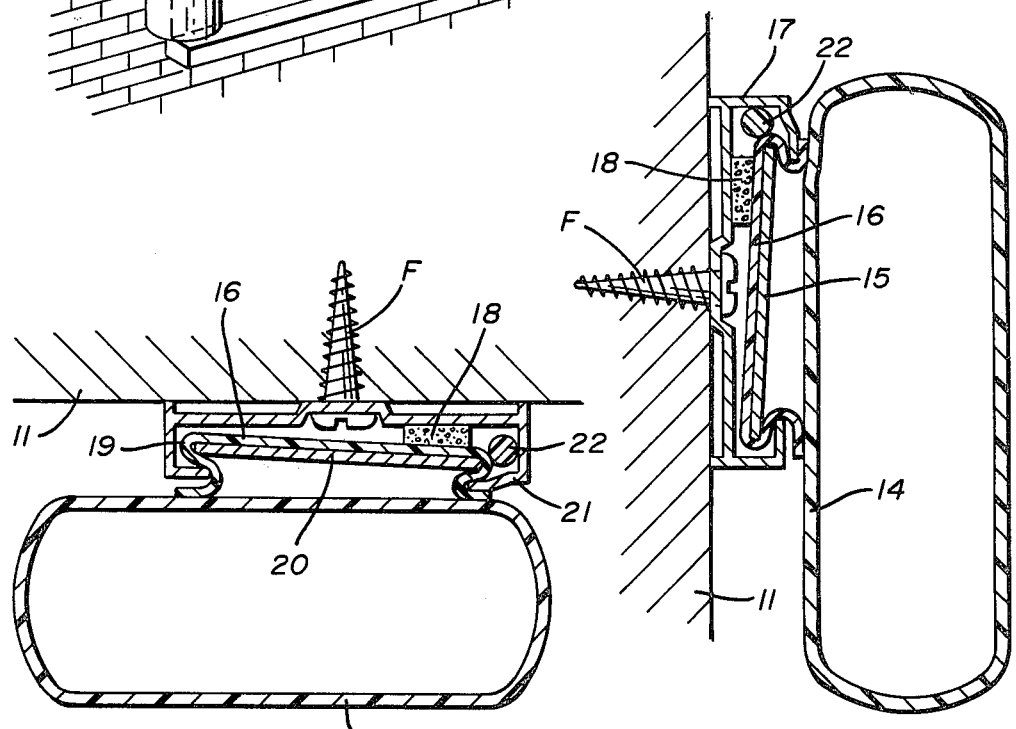
FIG. 3
FIG. 2

MOUNTING FOR INFLATABLE DOCK SEAL

BACKGROUND OF THE INVENTION (1) Field of the Invention

This invention relates to devices for mounting an inflatable dock seal or the like on a wall around a dock opening therein.

(2) Description of the Prior Art

Prior dock seal structures have been mounted on or in an opening in a building against which a truck or a trailer is to be positioned so as to seal the same with respect thereto. My earlier U.S. Pat. Nos. 3,303,615; 3,391,502; 3,391,503; and 3,714,745 show such typical structures.

In each of these patents wooden members were affixed to the wall in or about the dock opening and the inflatable structure attached thereto. In my prior U.S. Pat. No. 4,045,925 an improved mounting is disclosed wherein uninflatable flexible tubular members are formed on the inflatable portion of the dock seal at the sides thereof and structural members are engaged in the flexible tubular members and secured to the wall at their upper and lower ends. The upper transverse portion of the dock seal is secured to a wooden member which in turn was affixed to the building wall.

The present invention discloses an inflatable dock seal and an improved mounting construction incorporated therewith for mounting the same quickly and easily as compared with the constructions heretofore known in the art.

SUMMARY OF THE INVENTION

An inflatable dock seal comprising an inverted U-shaped inflatable member positioned around a dock opening in a building wall so as to seal a truck or trailer body with respect thereto is provided with uninflatable flexible channel members on its surfaces engagable against the wall about the dock opening. Elongated structural members are disposed in the uninflatable channel members for engagement in elongated cross sectionally C-shaped channel members affixed to the wall about the dock opening so as to quickly and easily mount the inflatable dock seal thereto. The structural members are of greater width than the width of the opening between the longitudinal edges of the C-shaped channel members.

The invention eliminates the wooden member or members which were heretofore used and which were expensive and time consuming both in mounting on the wall and in securing the dock seal thereto.

In the present invention several cylindrical plugs are inserted in the channel cross sectionally C-shaped member securing the uninflated flexible channel member and inflatable member to the wall about the dock opening to restrict lateral movement of the elongated structural members.

DESCRIPTION OF THE DRAWINGS

FIG. 1 is a perspective elevation of an inflatable dock seal and mounting with parts broken away and parts illustrated in broken lines;

FIG. 2 is an enlarged cross section on line 2—2 of FIG. 1;

FIG. 3 is an enlarged cross sectional on line 3—3 of FIG. 1;

DESCRIPTION OF THE PREFERRED EMBODIMENT

Figure 4:
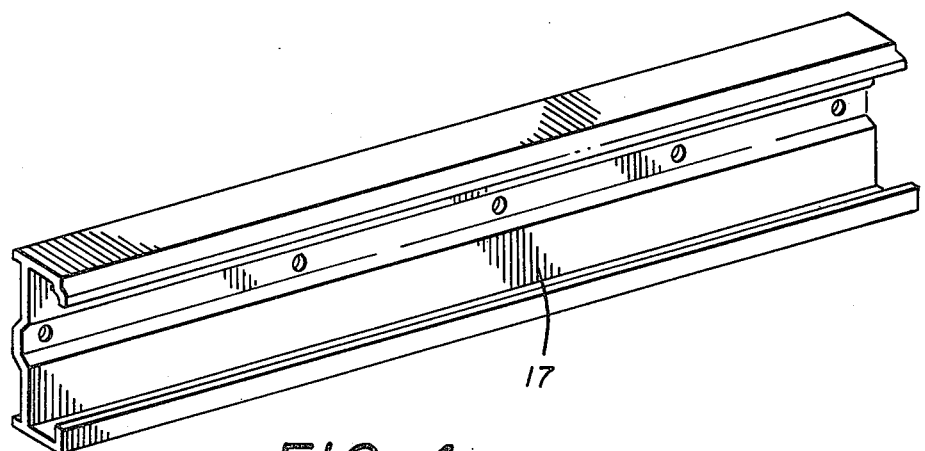
FIG. 4 is a perspective view of a member seen in FIG. 1.

By referring to the drawings, and FIGS. 1 and 2 in particular, it will be seen that a loading dock opening 10 is located in a building wall 11 and provided with a pair of vertical inflatable members 12 and 13 at the sides thereof together with a horizontally disposed inflatable member 14 across the top thereof. An elongated structural member 15 of a known width is positioned in an elongated flexible channel member 16 attached to the outer rear surface of the horizontally disposed inflatable member 14. An elongated rigid cross sectionally C-shaped channel member 17 is secured to the wall 11 by a plurality of fasteners F as seen in FIG. 2 of the drawings. The width of the opening between the opposed edges of the cross sectionally C-shaped channel member 17 is less than the known width of said elongated structural member 15 so as to require the elongated structural member 15 and the flexible channel member 16 to be moved edgewise into the cross sectionally C-shaped channel member 17. The channel member 17 is thus able to receive and hold the elongated structural member 15 and the elongated flexible channel member 16 and the horizontally disposed inflatable member 14 securely on the wall 10.

Additional uninflatable flexible channel members 19 are attached longitudinally to the outer rearsides of the vertical inflatable members 12 and 13 and additional elongated structural members 20 of known widths are disposed therein and which are engaged in additional rigid cross sectionally C-shaped channel members 21 on the wall 11 as seen in FIG. 3 of the drawings so as to secure the vertical inflatable members 12 and 13 to the wall 11 at the sides of the dock opening 10.

Locking cylindrical plugs 22 as best seen in FIGS. 2 and 3 of the drawings are positioned in the cross sectionally C-shaped channels 17 and 21 so as to restrict lateral movement of the elongated structural members 15 and 20 within the elongated cross sectionally C-shaped channels 17 and 21.

Those skilled in the art will observe that the upper ends of the vertical inflatable members 12 and 13 may be and preferably are continuously joined with the horizontally disposed inflatable member 14. The lower ends of the inflatable members 12 and 13 are closed and air introduced into the inflatable members 12, 13, and 14 by a blower 23 preferably mounted in a housing 24 above the dock opening 10 delivers the air to the inflatable members 12, 13 and 14 by way of a tubular connection 25 as seen in FIG. 1 of the drawings.

Figure 5:
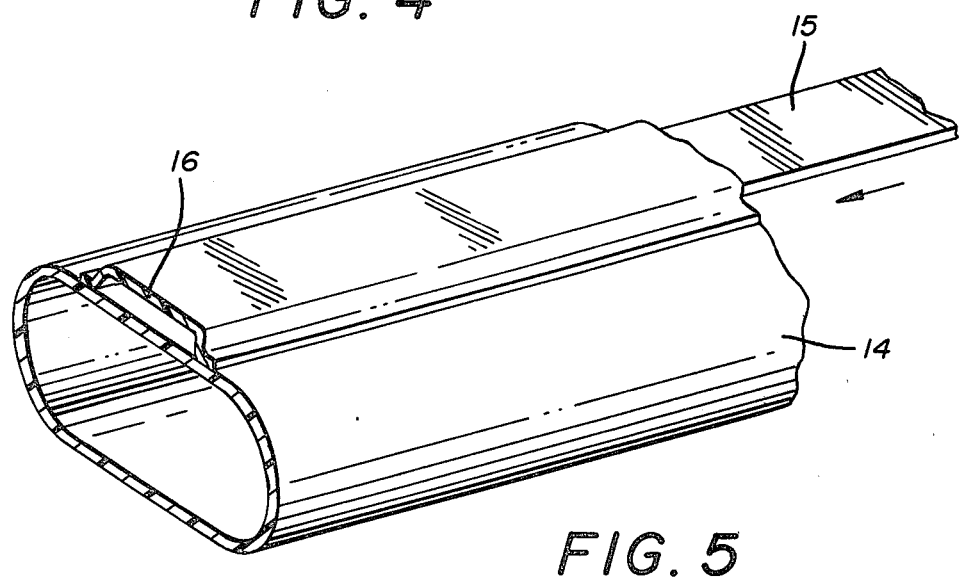
FIG. 5 is an enlarged detail on one of the inflatable members seen in FIGS. 2 and 3 of the drawings.

By referring now to FIG. 5 of the drawings, it will be seen that the elongated structural member 15 which is preferably formed of a material such as a strip of rigid fiberglass board is inserted in the elongated flexible channel member 16 on the inflatable member before the inflatable member is attached to the wall 11.

By referring now to FIG. 2 of the drawings, it will be seen that by moving the elongated structural member 15 and the elongated flexible channel 16 sidewardly into the relatively narrow opening defined by the C-shaped channel member 17, the foam strip 18 is distorted and the inflatable member 14 will be securely held in engagement in the rigid channel member 17 and thereby properly secure the inflatable member on the wall 11.

In FIG. 3 of the drawings, the same mounting arrangement is employed as the elongated structural member 20 in the flexible channel member 19 is positioned through the relatively narrow opening defined longitudinally by the cross sectionally C-shaped channel member 21.

The assembly is preferably held in relatively immovable relation by the introduction of the cylindrical plugs 22 into the open ends of the cross sectionally C-shaped channel members 17 and 21 respectively as illustrated in FIGS. 2 and 3 of the drawings. The cylindrical plugs 22 are preferably formed of plastic material.

Installation of the inflatable dock seal disclosed herein is rapid and relatively easy as the sections of the cross sectionally C-shaped rigid mounting channel are simply affixed to the surface of the wall 11 by the fasteners F, the elongated structural members 15 and 20 inserted in the respective flexible channels 16 and 19 and engaged in the C-shaped channel members 17 and 21 as hereinbefore described whereupon connection of the blower 23 completes the installation of the inflatable dock seal.

It will thus be seen that an improved mounting for an inflatable dock seal or the like has been disclosed which eliminates the heretofore costly and time consuming reliance on wood or other frame-like mounting devices and achieves a relatively inexpensive and fast labor saving mounting of a dock seal about a dock opening in a building wall or the like.

Although but one embodiment of the present invention has been illustrated and described, it will be apparent to those skilled in the art that various changes and modifications may be made therein without departing from the spirit of the invention and having thus described my invention.

What I claim is:

1. An inflatable dock seal and mounting therefor for positioning said dock seal on a wall above and beside a dock opening therein and comprising at least one flexible inflatable member arranged in an inverted U-shape having an upper horizontal section and a pair of spaced vertical sections, flexible channel members formed on the exteriors of said horizontal and vertical sections, elongated structural members of known widths positioned in said flexible channel members, rigid cross sectionally C-shaped channel members having opposed edges with the width of the opening between said opposed edges being less than the known width of said elongated structural members, said elongated structural members and said flexible channel members being movably engaged in said rigid cross sectionally C-shaped channel members, the arrangement requiring said elongated structural members to be moved edgewise when positioned therein.

2. The inflatable dock seal and mounting therefor set forth in claim 1 and wherein said flexible channel members are cross sectionally flat channels, outturned longitudinally extending offset flanges on the longitudinal edges thereof being secured to said sections of said inflatable dock seal.

3. The inflatable dock seal and mounting therefor set forth in claim 1 and wherein distortable means are positioned in said cross sectionally C-shaped channel members for holding said elongated structural members and said portions of said flexible channel members therein.

4. The inflatable dock seal and mounting therefor set forth in claim 3 and wherein said distortable means comprises a strip of resilient foam material.

* * * * *